May 18, 1965 E. C. BRAINARD II 3,183,717
RECORDING THERMOGRAPH
Filed Oct. 9, 1962 2 Sheets-Sheet 2

INVENTOR.
EDWARD C. BRAINARD, II
BY
Kenway, Jenney & Hildreth
ATTORNEYS

United States Patent Office 3,183,717
Patented May 18, 1965

3,183,717
RECORDING THERMOGRAPH
Edward C. Brainard II, Marion, Mass., assignor to Braincon Corporation, Marion, Mass., a corporation of Masachusetts
Filed Oct. 9, 1962, Ser. No. 229,357
6 Claims. (Cl. 73—343.5)

My invention relates generally to temperature recording devices and more particularly to devices for recording temperatures over long periods of time on photographic film.

In many situations it is desirable to obtain continuous, long term temperature or like recordings. It is frequently desirable, if not necessary, that the recording device be capable of operation for extended periods of time, such as one year or more, without replacement of power supplies or recording medium. It also frequently occurs that the environmental conditions present at the desired recording site are hostile to the recording device as well as usually making continuous monitoring and control of the device extremely difficult, if not impossible.

The need for a temperature recording device, and the presence of such adverse conditions, occur simultaneously in the field of oceanographic research. While it is not intended to limit the present invention to applications in the oceanographic research field, it should be noted that in this area a particular need is present for a recording device which may be immersed in sea water at great depths and which will operate without attention for periods in excess of a year. Sustained accuracy is required as well as a recording medium which may be easily "readout" when the recording period is ended. The power supplies, if any, must, therefore, be sufficient to last for the period of time contemplated and the recording medium must be of a type which will not deteriorate during the period.

It is, accordingly, an object of this invention to provide a recording device capable of sustained operation without replenishment of power supply or recording medium.

It is a further object of this invention to provide a temperature recording device of the type described for continuous, unattended temperature recording for periods in excess of one year.

It is another object of this invention to provide a temperature recording device of the type described which will record daily, hourly or other time-spaced temperature recordings for extended periods of time.

It is yet another object of this invention to provide a temperature recording device in which all of the components may be encased in a suitable protective casing whereupon the instrument may be operated in a hostile environment.

Another object of my invention is to provide a recording device of the type described which is simple and reliable in operation while yet being compact and economical in construction.

In the practice of my invention in a preferred embodiment thereof a temperature recording device is constructed which employs photographic film as the recording medium. A mercury thermometer is positioned against the photographic film and a phosphorescent light source is positioned against the thermometer such that a "contact print" of the position of the mercury in the thermometer is made on the photographic film. The film is advanced by suitable means past the stationary thermometer and light source and is wound on a take-up reel. The whole unit is encased in a protective casing which is designed for use in such environment as sea water.

Thermographs of the same general type as my invention have been described heretofore as, for example, in U.S. Patent No. 2,314,925 (M. B. De Bengoa). However, these prior devices have had several deficiencies. Among these, the light source required to expose the film has been large and therefore bulky, and usually requires a source of power; further, the definition of the image on the film was poor.

My present invention includes specific novel structure which results in a substantial increase in light source efficiency and at the same time produces an appreciably improved image of the thermometer on the film.

It is a feature of this invention that a phosphorescent light source is employed using a radioactive exciter thereby requiring no external power supply.

It is a further feature of this invention that standard 70 millimeter photographic film is used as the recording medium which film may be processed in the usual fashion.

It is yet another feature of this invention that the film is exposed in a stepped fashion thereby providing a permanent record of temperature conditions taken at predetermined intervals.

These and other objects and features of the invention will in part be obvious and will in part appear as the description proceeds with the aid of the accompanying drawings in which.

Figure 1:
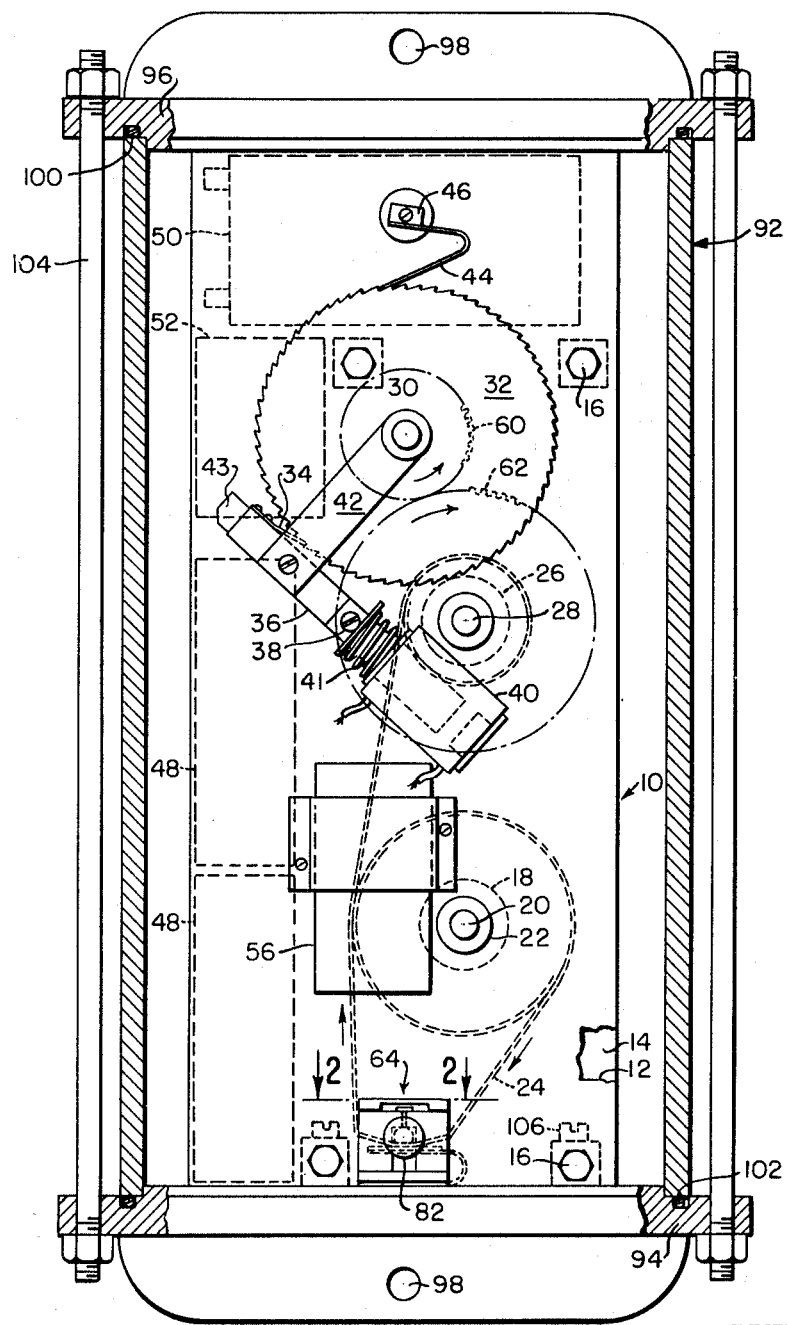
FIG. 1 is a side view of the invention in assembled condition with portions broken away and in section.

In FIG. 1 of the drawings, a preferred embodiment of the invention in the form of a graphical temperature recording device, herein referred to as a recording thermograph for oceanographic research is shown. The thermograph is provided with a supporting frame indicated generally at 10 which is formed by a pair of parallel side plates 12 and 14. The side plates 12 and 14 are mounted in parallel spaced condition by a plurality of mounting posts 16. A photographic film supply reel 18 (shown in broken line in FIG. 1) is journaled between the plates 12 and 14 on a reel shaft 20 which is rotatably received in the side plates. The reel shaft 20 is fitted with collars at its extremities, for example, a collar 22 in position adjacent the exterior of the side plate 12, to prevent the shaft 20 from sliding out of journaled condition. The supply reel 18 is of conventional type and, as will be hereinafter described, is loaded with standard photographic film 24.

A take-up reel 26 is also journaled between the side plates 12 and 14 and receives the film 24 after it has been exposed, as will be further described below. The take-up reel 26 is fitted with a reel shaft 28, which is secured in journaled condition by the use of collars similar to the collar 22.

It will be noted that the supply reel 18 may be easily removed from its journaled condition by loosening one of the collars 22 and sliding the shaft 20 outwardly through one of the side plates 12, 14. The reel 18 may then be moved laterally out of the enclosure.

Also journaled between the side plates 12 and 14 is a driving shaft 30. The shaft 30 extends outwardly of the side plates 12 and 14 and, as will be seen in FIG. 1 is fitted with a ratchet wheel 32 adjacent the exterior of the side plate 12.

The ratchet wheel 32 is part of the stepping mechanism for advancing the film 24. The ratchet wheel 32 is stepped by means of a pawl 34 which is mounted on a linkage 36 connected to the shaft 38 of a solenoid 40 positioned on the exterior of the side plate 12. Upon actuation of the solenoid, as hereinafter described, the shaft 38 is withdrawn into the solenoid core and the linkage 36 draws the pawl 34 toward the solenoid, simultaneously engaging the pawl 34 with the ratchet wheel 32. The pawl is maintained in spaced radial relation to the ratchet wheel by a swingable arm 42 which is pinned to the linkage 36 at one end and is rotatably received on the shaft 30 at its other end. The stroke of the solenoid 40 and the spacing of the teeth of the ratchet wheel 32 are selected such that the pawl 34 will move the ratchet wheel 32 one step for each actuation of the solenoid 40. The solenoid shaft 38 is fitted with a spring 41 whereby the shaft 38, linkage 36 and pawl 34 are returned to their initial position when actuation of the solenoid 40 ceases. A stop 43 is mounted on the side plate 12 to prevent over-travel of the pawl 34, linkage 36 etc.

The pawl 34 is constructed of a somewhat resilient material such as copper or aluminum in order that it may ride back to its initial position without causing the ratchet wheel to rotate in a backwards or clockwise direction as seen in FIG. 1. To insure that the ratchet wheel 32 will not rotate in a clockwise direction, a second pawl 44 is provided which engages the ratchet wheel 32 and is attached to the side plate 12 by means of a base 46. The pawl 44 engages the teeth of the ratchet wheel 32 so as to hold the ratchet wheel 32 during the return stroke of the pawl 34.

Figure 4:
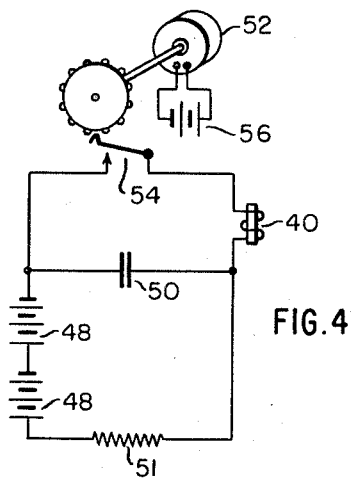
FIG. 4 is a diagrammatic representation of the control circuit of my invention.

In the following description, the reader should refer to both FIGURE 1 and to FIGURE 4 of the drawings. The electrical power required to operate the solenoid 40 is supplied by battteries 48 which are mounted between the side plates 12 and 14. In the illustrated embodiment the solenoid requires 135 volts and two 67½ volt batteries are used in series. The batteries 48 continuously charge a condenser 50 which is also mounted between the side plates 12 and 14. To this end, the batteries are connected in series with a current limiting resistor 51 and condenser 50. The condenser 50 is charged continuously but at a very low rate from the batteries 48 until the condenser voltage equals the battery voltage. Because of the low current drain on the batteries, the battery life is substantially the same as the shelf life.

The solenoid 40 is actuated at spaced intervals through the use of an electric clock mechanism 52 which is mounted between the side plates 12 and 14. At predetermined intervals the clock mechanism 52 actuates a switch 54 which is in series with the condenser 50 and the solenoid 40 thereby discharging the condenser through the solenoid 40 and actuating it. The clock 52 is driven by a separate battery power supply 56, which in the preferred embodiment comprises a pair of 1½ volt dry cells.

When the solenoid is actuated, it causes rotation of the ratchet wheel 32 which in turn drives the take-up reel 26 through a reduction gear system which is positioned at the exterior of the side plate 14. Thus, the driving shaft 30 extends through the side plate 14 and is fitted with a small radius gear 60. The gear 60 meshes with a larger gear 62 which is mounted securely on the reel shaft 28 of the take-up reel 26. The solenoid is, as noted, actuated at spaced time intervals by the clock 52. It will be understood that the spaced time intervals may be changed by proper modification of the clock mechanism.

The film 24 in the preferred embodiment is standard 70 millimeter, black and white photographic film. The film is advanced in steps by the take-up reel 26 as described above and pays off the supply reel 18 which is free to rotate in response to the advancement of the film. After leaving the supply reel 18, the film passes beneath an exposing head indicated generally at 64.

Figure 2:
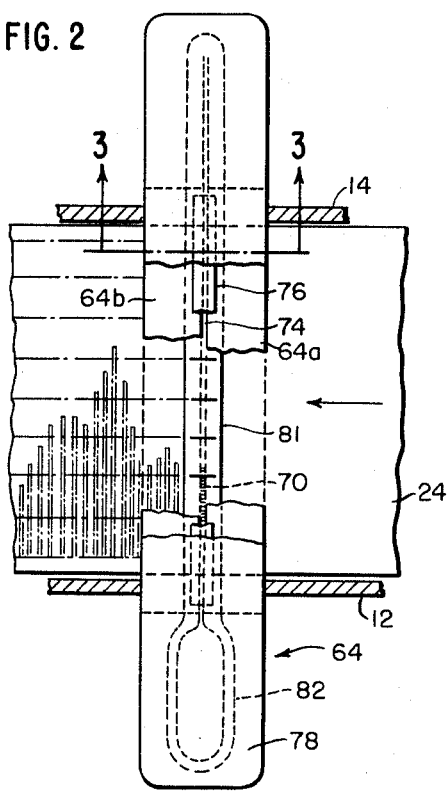
FIG. 2 is a section taken on the line 2—2 of FIG. 1.
Figure 3:
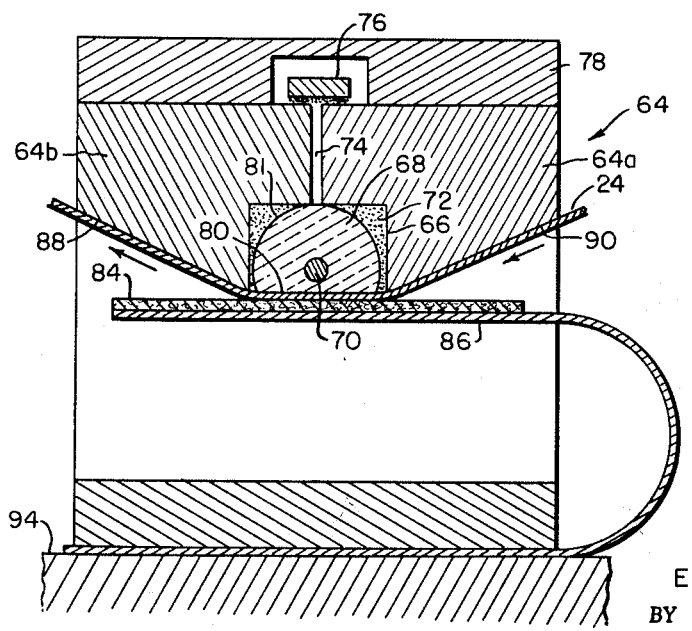
FIG. 3 is a section taken on the line 3—3 of FIG. 2.

The structure of my invention includes an exposing head 64, which is illustrated in detail in FIGURES 2 and 3, mounted between the side plates 12 and 14. The head 64 is constructed in two pieces, 64a and 64b which form a channel 66 in the undersurface of the head normal to the pass line of the film 24. Housed within the channel 66 is a mercury thermometer 68 having the usual bulb 82 and capillary or bore 70, formed in a stem of glass or other transparent material. While mercury is referred to herein any suitable opaque substance may be used. The thermometer 68 may be secured in the channel 66 by any suitable means as, for example, an epoxy adhesive 72. The capillary 70 of the thermometer 68 is also positioned normal to the pass line of the film 24. Formed through the head 64 in longitudinal alignment with the capillary 70 is a narrow slit 74. In the illustrated embodiment the slit 74 is formed by the positioning of the head pieces 64a and 64b. In the preferred embodiment the slit is approximately 0.01 inch in width. Positioned directly above the slit 74 is a phosphorescent light source 76 comprising, in the preferred embodiment, a flat member coated on one surface with a phosphorescent material such as zinc sulfide. The light source 76 also includes a radioactive exciter such as radium sulfate having a half-life at least equal to the desired operating life of the instrument. Positioned above and surrounding the light source 76 is a shielding member 78 which protects the film on the supply reel 26 from fogging due to gamma radiation emitted by the radioactive material.

It will be noted that the stem of the thermometer 68 is specially constructed to have an undersurface 80 which is substantially flat and an upper surface 81 which is substantially semi-cylindrical. The undersurface 80 is spaced a relatively slight distance from the capillary 70. In this fashion the film 24 may pass the thermometer 68 closely adjacent the capillary 70 therein. It will be especially noted that the flattened bottom 80 on the thermometer 68 in combination with the substantially semi-cylindrical upper surface 81 results in the initial focusing of the light entering through the upper surface 81 along the line of the capillary 70. Since the undersurface 80 is substantially flat, however, the focused light is prevented from being refracted back to a wide beam upon leaving the thermometer 68. In this fashion the relatively wide beam entering the thermometer is focused at the capillary 70 and remains a narrow beam when leaving the thermometer. As a result, the efficiency of the light source is improved substantially. Additionally, a narrow beam of light is cast on the film, thereby giving the image much better definition or sharpness. The definition of the image is also improved substantially by the use of a flattened undersurface 80 which permits closer positioning of the film to the capillary 70 as compared to the prior art.

The light source 76 constantly emits a quantity of light, a part of which is directed along the longitudinal axis of the thermometer 68 by the slit 74. When the film 24 is positioned beneath the exposing head 64 the film will be exposed along the axis of the capillary. It will be noted that the film will not be exposed along that portion of the capillary 70 which is filled with mercury. By initially selecting a thermometer having a range which is suitable for the measurements desired it is possible to provide a permanent record of temperature variations over an extended period of time by stepping the film past the thermometer and light source and recording thereon the position of the mercury in the thermometer. The thermometer may also be provided with degree markings which will also be indicated on the exposed film. In this fashion any lateral movement of the film with respect to the thermometer will not destroy the accuracy of the recording.

In order to position the film for exposure a pressure pad 84 is provided under the head 64. A suitable leaf spring 86 urges the pressure pad 84 toward the head 64. It will also be noted that the lower corners 88 and 90 of the head 64 are rounded to prevent scratching of the film emulsion.

The entire instrument above described may be provided with a suitable protective casing as seen in FIG. 1 where a tubular sleeve 92 is shown fitted with end caps 94 and 96 respectively. The end caps 94 and 96 may be provided with apertures 98 for the purpose of securing the container to a suitable support or line. The end caps 94 and 96 are sealed with respect to the tubular sleeve 92 by means of O-rings 100 and 102. Compression bolts 104 extending between the end caps 94 and 96 are used to secure the container in assembled condition.

The operation of the invention is as follows:

With the unit in assembled condition prior to insertion within the container, the shaft 20 of the supply reel 18 is removed and a fresh supply of 70 millimeter film is installed in the unit. The film is threaded past the exposing head 64 and thence to the take-up reel 26. The lead end of the film may be attached to the shaft 28 of the take-up reel 26 by any suitable means such as, for example, masking tape. With the electrical supplies in place the unit will then function for an extended period of time without attention. The batteries 48 charge the condenser 50 which discharges on signal from the clock 52 to actuate the solenoid 40. The solenoid advances the pawl 34, in turn advancing the ratchet wheel 32 and the take-up reel 26 one step through the gear system and shaft 30. The step spacing is selected such that an unexposed strip of film will be left between each exposed portion.

In the preferred embodiment the clock 52 actuates the solenoid once each hour and as a result hourly temperature readings are recorded on the film in the form of an exposure of the position of the mercury within the capillary 70 of the thermometer.

When the unit has been loaded as described it is affixed to the end cap 94, as by screws 106 and the sleeve 92 and the end cap 96 are applied and secured by means of the compression bolts.

After use, the unit is unloaded in the reverse order whereupon the film may be developed by usual techniques and read directly to show temperature recordings.

While the preferred embodiment has disclosed a device having stepped recording intervals it will be understood that a continuously advancing film mechanism could be employed whereupon continuous strip recording of the position of the mercury in the thermometer would be achieved.

It will also be understood that other sensing devices than a thermometer could be employed in conjunction with an exposing head similar to the head 64, whereupon recordings of other conditions could be made.

Having thus disclosed a preferred embodiment of the invention it is my intention to claim all modifications and changes thereof within the spirit and scope of the appended claims.

I claim:

1. A recording thermograph comprising in combination a thermometer, said thermometer including a bulb portion and a stem portion, said bulb portion having a cavity formed therein and said stem having a capillary formed therein, the capillary in said stem being internally connected to said cavity; an opaque fluid contained in said cavity and said capillary, said stem being formed of transparent material, the cross section of said stem having a flat portion along one segment of the perimeter, the remaining perimeter segment having a constant radius of curvature, said capillary being closely adjacent the flat side thereof; means forming a surface coated with a light emitting material forming a light source; means supporting said coated surface substantially parallel to the flat side of said stem but on the opposite side thereof whereby light from said source impinges on the curved surface of said stem; means forming a narrow slit between said light source and the surface of said stem; a light sensitive film; means positioning a portion of said light sensitive film against the flat surface of said stem, and means for causing relative motion at predetermined times between said film and the combination of said light source, slit and thermometer.

2. The combination defined in claim 1 in which said light source includes a radioactive exciter material in combination with a phosphorescent material forming a coating on said light source.

3. The combination defined in claim 2 in which said radioactive exciter is radium sulfate and said phosphorescent material is zinc sulfide.

4. The combination defined in claim 1 wherein said means positioning the light sensitive film against the flat surface of the stem includes a leaf spring, and a pad mounted on said spring to urge said film against said flat surface of said stem, and wherein said means for causing relative motion between the film and the combination of the light source, slit and thermometer includes a film supply reel having a first portion of said film wound thereon; a film take-up reel having a second portion of said film wound therein, said film passing adjacent the flat surface of the thermometer between the supply and the take-up reels; a drive shaft; means connecting the drive shaft to the take-up reel; a ratchet wheel on the drive shaft; a solenoid; a linkage movable by the solenoid in two directions; a pawl connected to said linkage; means engaging the pawl with the ratchet wheel when the solenoid moves the linkage in a first direction thereby rotating the ratchet wheel; means for holding the ratchet wheel against counter-rotation when the solenoid moves the linkage in a second direction opposed to said first direction and means for operating the solenoid at predetermined intervals, said means including a clock mechanism, a battery, a condenser, a resistor, means connecting said battery, resistor and condenser in series, a switch operated by the clock mechanism, and means connecting the switch in series with the solenoid, the series combination of the switch and solenoid being connected in parallel with the condenser.

5. A recording thermograph comprising in combination a thermometer, said thermometer including a bulb portion and a stem portion, said bulb portion having a cavity formed therein and said stem having a capillary formed therein, the capillary in said stem being internally connected to said cavity; an opaque fluid contained in said cavity and said capillary, said stem being formed of transparent material, the cross section of said stem having a flat portion along one segment of the perimeter, the remaining perimeter segment having a constant radius of curvature, said capillary being closely adjacent the flat side thereof; means forming a surface coated with a light emitting material forming a light source; means forming a narrow slit between said light source and the surface of said stem; a light sensitive film; means positioning a portion of said light sensitive film against the flat surface of said stem; means supporting said coated surface substantially parallel to the flat side of said stem but on the opposite side thereof whereby light from said source impinges on the curved surface of said stem, said means including an exposing head havnig first walls on said head for receiving said coated surface, second walls on said head defining a channel for receiving said thermometer, third walls on said head defining said slit, and having means for mounting said thermometer in said channel, said walls defining said channel for receiving said thermometer terminating substantially in the plane of said flat surface on said thermometer whereby said film may be positioned against said flat surface by said means for positioning a portion of said film thereagainst, and means for causing relative motion at predetermined times between said film and the combination of said light source, slit and thermometer.

6. A recording thermograph comprising in combination a thermometer, said thermometer including a bulb portion and a stem portion, said bulb portion having a cavity formed therein and said stem having a capillary formed therein, the capillary in said stem being internally connected to said cavity; an opaque fluid contained in said cavity and said capillary, said stem being formed of transparent material, the cross section of said stem having a perimeter which is flat along one portion thereof and circular along the remaining portion thereof, said capillary being closely adjacent the flat side thereof; a flat surface coated with phosphorescent material forming a light source; means supporting said coated surface substantially parallel to the flat side of said stem but on the opposite side thereof whereby light from said source impinges on the curved surface of said stem; means forming a narrow slit between said light source and the surface of said stem; said means including an exposing head, said exposing head being formed as two L-shaped pieces, means supporting said L-shaped pieces in assembled condition with the short legs thereof in opposed relation to define said slit therebetween, walls on said head positioning said coated surface in alignment with one end of said slit and other walls positioning said thermometer with said capillary in alignment with the other end of said slit; a light sensitive film; means positioning a portion of said light sensitive film against the flat surface of said stem, and means for causing relative motion at predetermined times between said film and the combination of said light source, slit and thermometer.

References Cited by the Examiner

UNITED STATES PATENTS

| | | | |
|---|---|---|---|
| Re. 10,189 | 8/82 | Peroni | 73—372 |
| 685,958 | 11/01 | Tesla | 317—151 X |
| 1,255,202 | 2/18 | Messiter | 346—141 X |
| 1,506,764 | 9/24 | May | 346—107 X |
| 1,718,626 | 6/29 | Bleecker | 250—71 X |
| 1,980,786 | 11/34 | Cool | 346—146 |
| 2,314,925 | 3/43 | DeBengoa | 73—343.5 |
| 2,395,600 | 2/46 | Weisglass | 317—151 X |
| 2,538,029 | 1/51 | Munger | 346—108 |
| 2,540,911 | 2/51 | Rembusch et al. | 346—107 X |
| 2,629,646 | 2/53 | Warrick | 346—108 |

FOREIGN PATENTS 312,257    2/56    Switzerland.

ISAAC LISANN, *Primary Examiner.*